United States Patent
Barreh et al.

(10) Patent No.: US 11,023,342 B2
(45) Date of Patent: Jun. 1, 2021

(54) CACHE DIAGNOSTIC TECHNIQUES

(71) Applicant: Western Digital Technologies, Inc., San Jose, CA (US)

(72) Inventors: Jama I. Barreh, Austin, TX (US); Robert T. Golla, Austin, TX (US); Thomas M. Wicki, Palo Alto, CA (US); Matthew B. Smittle, Allen, TX (US)

(73) Assignee: Western Digital Technologies, Inc., San Jose, CA (US)

( * ) Notice: Subject to any disclaimer, the term of this patent is extended or adjusted under 35 U.S.C. 154(b) by 212 days.

(21) Appl. No.: 16/264,118

(22) Filed: Jan. 31, 2019

(65) Prior Publication Data
US 2020/0174903 A1 Jun. 4, 2020

Related U.S. Application Data

(60) Provisional application No. 62/773,882, filed on Nov. 30, 2018.

(51) Int. Cl.
| | |
|---|---|
| *G06F 11/00* | (2006.01) |
| *G06F 11/263* | (2006.01) |
| *G06F 9/30* | (2018.01) |
| *G06F 11/273* | (2006.01) |

(52) U.S. Cl.
CPC ........ *G06F 11/263* (2013.01); *G06F 9/30101* (2013.01); *G06F 11/2736* (2013.01)

(58) Field of Classification Search
CPC ............. G06F 11/3656; G06F 11/3664; G06F 11/263; G06F 11/2736
See application file for complete search history.

(56) References Cited

U.S. PATENT DOCUMENTS

| | | | |
|---|---|---|---|
| 5,615,331 A | 3/1997 | Toorians et al. | |
| 6,591,378 B1 | 7/2003 | Arends et al. | |
| 7,665,002 B1 * | 2/2010 | White ............ | G01R 31/318583 714/733 |

(Continued)

OTHER PUBLICATIONS

Tim Newsome, et al., "RISC-V External Debug Support; Version 0.13.1—Draft; 70da60cec1f57df61b68e8f2ef9b75dae71b7486," SiFive, Inc., Mon Nov. 5 13:08:38 2018—0800, 107 pages.

*Primary Examiner* — Elmira Mehrmanesh

(74) *Attorney, Agent, or Firm* — Kowert, Hood, Munyon, Rankin & Goetzel, P.C.

(57) ABSTRACT

Techniques are disclosed relating to cache debug using control registers based on debug commands. In some embodiments, an apparatus includes a processor core, debug circuitry, and control circuitry. In some embodiments, the debug circuitry is configured to receive external debug inputs and send abstract commands to the processor core based on the external debug inputs. In some embodiments, the control circuitry is configured to, in response to an abstract command to read data from the cache: write cache address information to a first control register, assert a trigger signal to cause a read of the data from the cache to a second control register, based on the cache address information in the first control register, and send data from the second control register to the debug circuitry. In various embodiments, this may facilitate hardware cache debug using debug circuitry that also controls software debugging.

17 Claims, 9 Drawing Sheets

(56) References Cited

U.S. PATENT DOCUMENTS

| | | |
|---|---|---|
| 8,166,361 B2 | 4/2012 | Ong |
| 8,200,908 B2 * | 6/2012 | Moyer ................ G06F 12/0831 711/141 |
| 8,688,910 B2 * | 4/2014 | Moyer ................ G06F 12/0831 711/118 |
| 8,745,446 B2 * | 6/2014 | Sato .................... G06F 11/3648 714/31 |
| 9,053,233 B2 * | 6/2015 | Moyer ................ G06F 11/3656 |
| 9,158,661 B2 | 10/2015 | Blaine et al. |
| 9,223,678 B2 | 12/2015 | Moyer et al. |
| 9,262,293 B2 * | 2/2016 | Sarangi ............ G01R 31/31721 |
| 9,606,175 B2 * | 3/2017 | Trethewey ......... G01R 31/3177 |
| 2009/0222693 A1 * | 9/2009 | Moyer ................ G06F 11/3656 714/25 |
| 2012/0151264 A1 * | 6/2012 | Balkan ................ G06F 11/3656 714/34 |
| 2017/0176524 A1 * | 6/2017 | Dewan ............. G01R 31/31705 |

* cited by examiner

I-Cache Array/Way/Index Selection Register (dicawics)

| Field | Bits | Description | Access |
|---|---|---|---|
| Array | 24 | Array select:<br>0: I-cache data array (including parity bits)<br>1: I-cache tag array (including parity bits) and status (including valid and LRU bits) | R/W |
| Way | 21:20 | Way select | R/W |
| Index | 15:2 | Index address bits select | RW |

I-Cache Array Data 0 Register (dicad0)

| Field | Bits | Description | Access |
|---|---|---|---|
| Data array: | | | |
| Instr | 31:0 | Instruction data | R/W |
| Tag array and status: | | | |
| Tag | 31:12 | Tag | R/W |
| LRU | 6:4 | Pseudo LRU bits<br><br>Bit 4: 0 = way 0/1; 1 = way 2/3<br>Bit 5: 0 = way 0; 1 = way 1<br>Bit 6: 0 = way 2; 1 = way 3 | R/W |
| Valid | 0 | 0 = cache line invalid; 1 = cache line valid | R/W |

I-Cache Array Data 1 Register (dicad1)

| Field | Bits | Description | Access |
|---|---|---|---|
| Parity1 | 1 | Even parity for data bytes 2/3 (instr[31:16]) | R/W |
| Parity0 | 0 | Even parity for data bytes 0/1 (instr[15:0]) or Even parity for tag | R/W |

I-Cache Array Go Register (dicago)

| Field | Bits | Description | Access |
|---|---|---|---|
| Go | 0 | Read triggers a cache read, write triggers a cache write | R/W |

FIG. 6

```
┌─────────────────────────────────────────────────────────────────────┐
│ Write array/way/address information indicating which location to    │
│ access in the I-cache to the dicawics register                      │
│                              710                                    │
└─────────────────────────────────────────────────────────────────────┘
                                  ↓
┌─────────────────────────────────────────────────────────────────────┐
│ Read the dicago register which causes a read access from the        │
│ I-cache data array at the location selected by the dicawics register│
│                              720                                    │
└─────────────────────────────────────────────────────────────────────┘
                                  ↓
┌─────────────────────────────────────────────────────────────────────┐
│ Read the dicad0 register to get the selected cache line chunk       │
│ (instr field), and read the dicad1 register to get the associated   │
│ parity bits (parity0 and parity1 fields)                            │
│                              730                                    │
└─────────────────────────────────────────────────────────────────────┘
```

FIG. 7

```
┌─────────────────────────────────────────────────────────────────────┐
│ Write array/way/address information which location to access in the │
│ I-cache to the dicawics register                                    │
│                              810                                    │
└─────────────────────────────────────────────────────────────────────┘
                                  ↓
┌─────────────────────────────────────────────────────────────────────┐
│ Write the new instruction information to the instr field of the     │
│ dicad0 register, and write the calculated correct instruction       │
│ parity bits (unless error injection should be performed) to the     │
│ parity0 and parity1 fields of the dicad1 register                   │
│                              820                                    │
└─────────────────────────────────────────────────────────────────────┘
                                  ↓
┌─────────────────────────────────────────────────────────────────────┐
│ Write to the go field of the dicago register which causes a write   │
│ access to the I-cache data array copying the information stored in  │
│ the dicad0/1 registers to the location selected by the dicawics     │
│ register                                                            │
│                              830                                    │
└─────────────────────────────────────────────────────────────────────┘
```

FIG. 8

Write array/way/address information which location to access in the I-cache to the dicawics register
910

Read the dicago register which causes a read access from the I-cache tag array and status bits at the location selected by the dicawics register
920

Read the dicad0 register to get the selected cache line's tag (tag field) and valid bit (valid field) as well as the set's LRU bits (lru field), and read the dicad1 register to get the tag's parity bit (parity0 field)
930

FIG. 9

Write array/way/address information which location to access in the I-cache to the dicawics register
1010

Write the new tag, valid, and LRU information to the tag, valid, and lru fields of the dicad0 register, and write the calculated correct tag parity bit (unless error injection should be performed) to the parity0 field of the dicad1 register
1020

Write to the go field of the dicago register which causes a write access to the I-cache tag array and status bits copying the information stored in the dicad0/1 registers to the location selected by the dicawics register
1030

CACHE DIAGNOSTIC TECHNIQUES

This application claims the benefit of U.S. Provisional Application No. 62/773,882, filed on Nov. 30, 2018, which is incorporated by reference herein in its entirety.

BACKGROUND

Technical Field

This disclosure relates generally to hardware debugging and more particularly to hardware cache debug using configuration registers and intermediate debug commands.

Description of the Related Art

Hardware debug circuitry may be important in various scenarios to detect and correct processor issues. Certain platforms, however, may not define debug commands for hardware debug of one or more caches in a processor core. It may be useful to read or write various cache-related information using hardware debug, such as: cached data, error protection information (e.g., parity bits), or status information (e.g., least-recently-used status).

BRIEF DESCRIPTION OF THE DRAWINGS

FIG. 6 is a diagram illustrating example cache control register fields, according to some embodiments.

FIG. 7 is a flow diagram illustrating an example method for reading instruction cache data and parity bits, according to some embodiments.

FIG. 8 is a flow diagram illustrating an example method for writing instruction cache data and parity bits, according to some embodiments.

FIG. 9 is a flow diagram illustrating an example method for reading instruction cache status information, according to some embodiments.

FIG. 10 is a flow diagram illustrating an example method for writing instruction cache status information, according to some embodiments.

Figure 1:
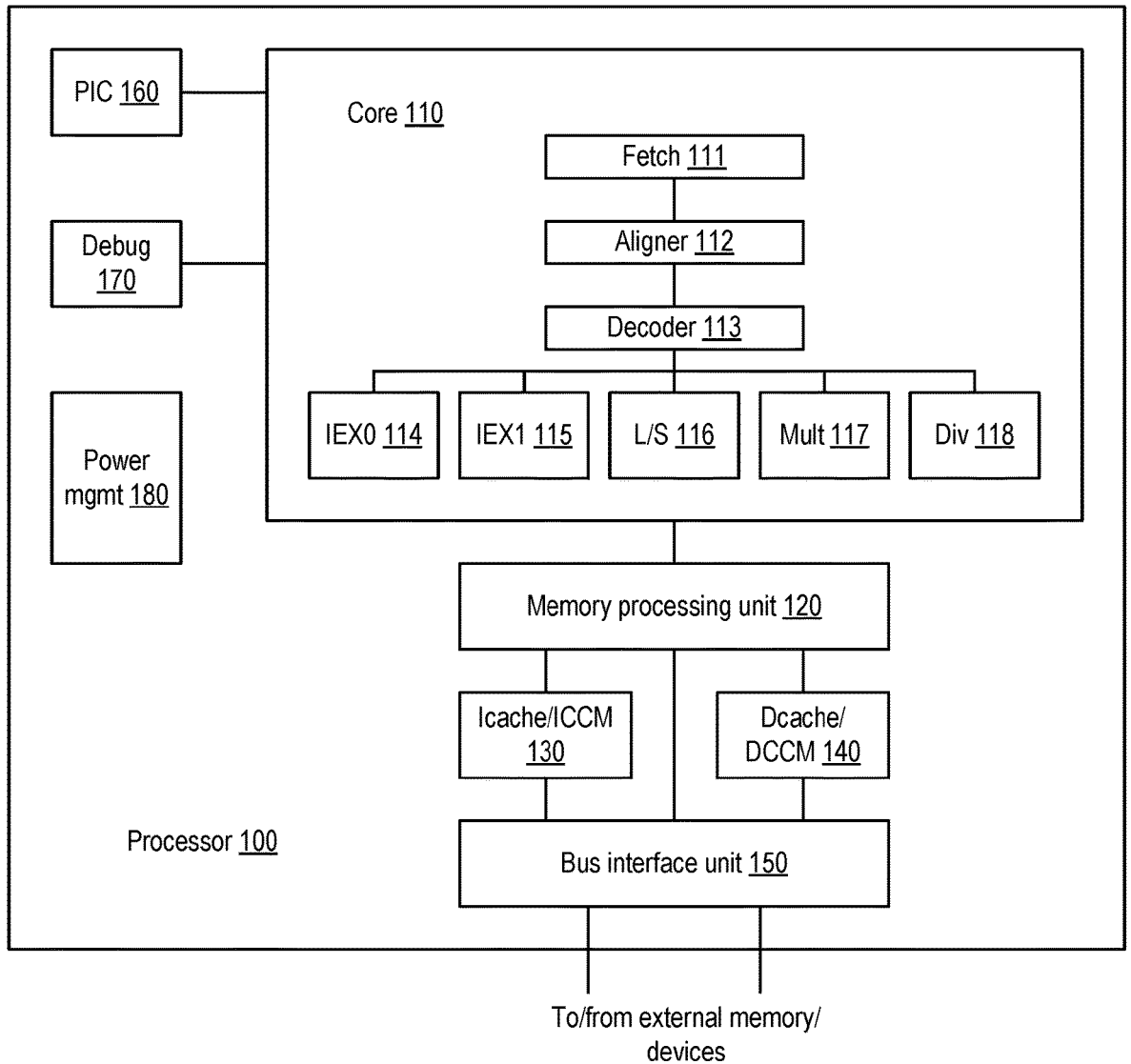
FIG. 1 is a block diagram illustrating an example processor, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "Control circuitry configured to write cache address information to a first control register" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 2:
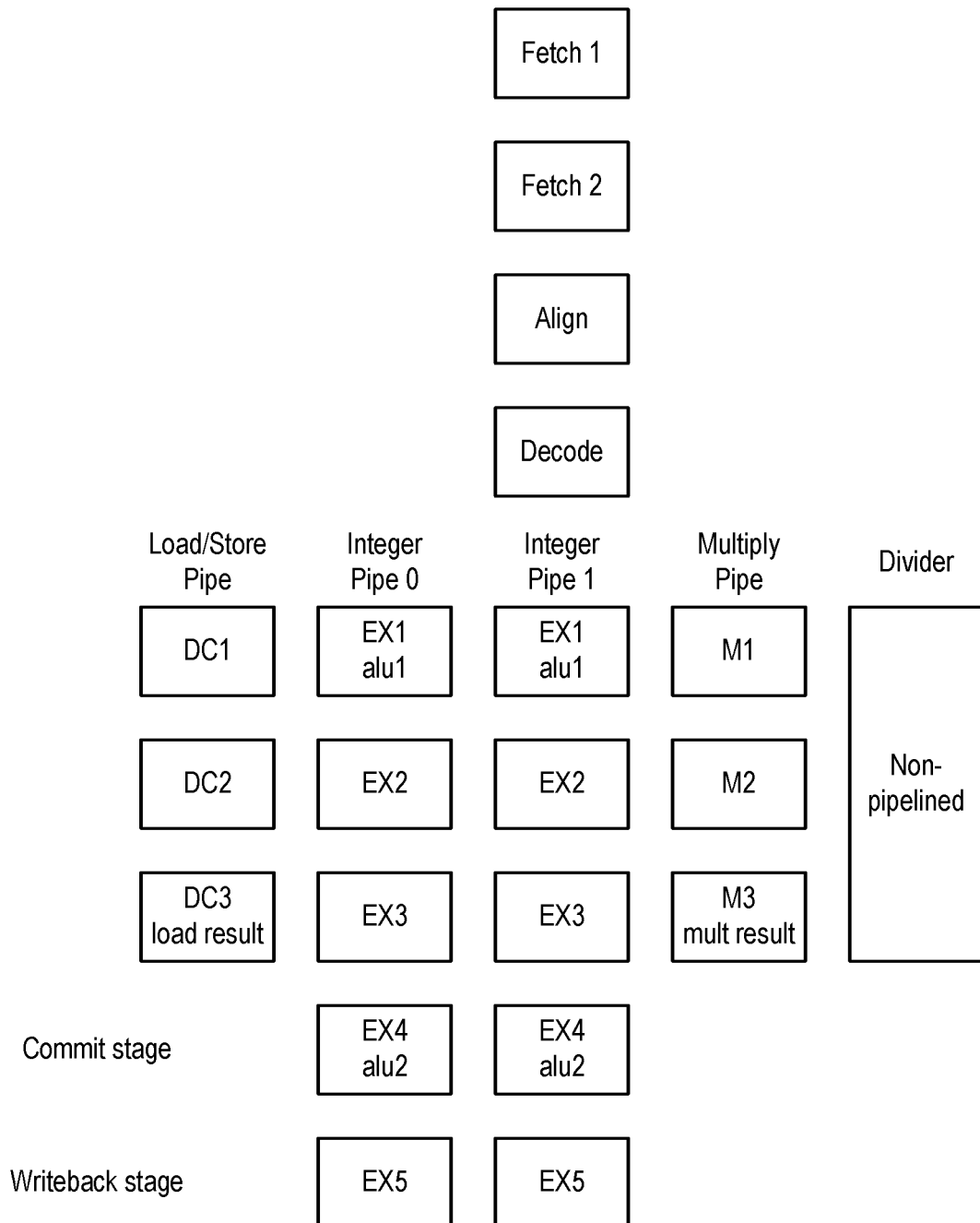
FIG. 2 is a diagram illustrating example pipeline stages, according to some embodiments.
Figure 3:
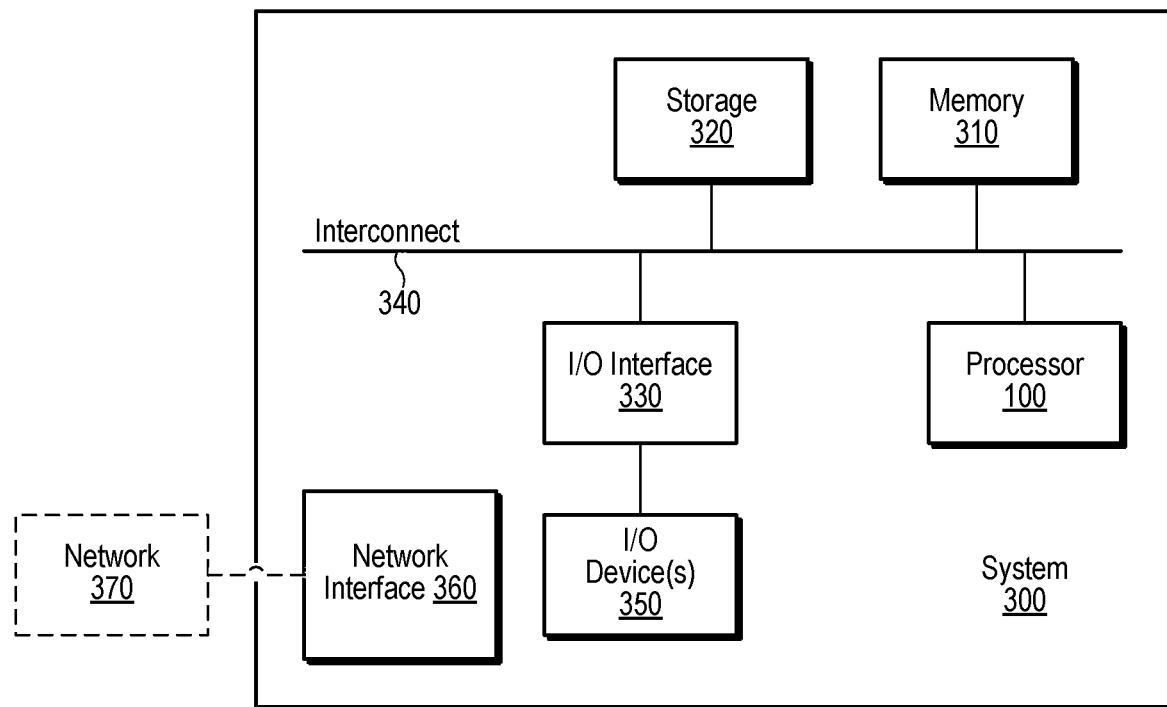
FIG. 3 is a diagram illustrating an example computing system, according to some embodiments.
Figure 4:
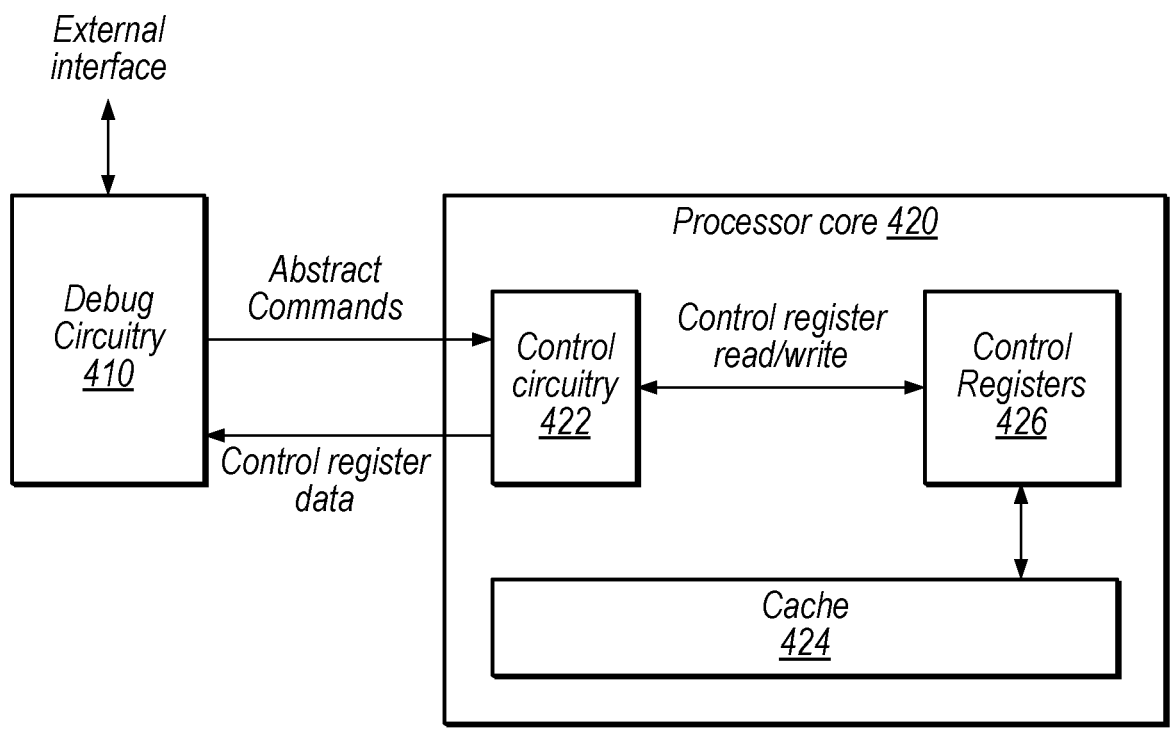
FIG. 4 is a block diagram illustrating an example processor core with debug control circuitry and control registers, according to some embodiments.
Figure 5:
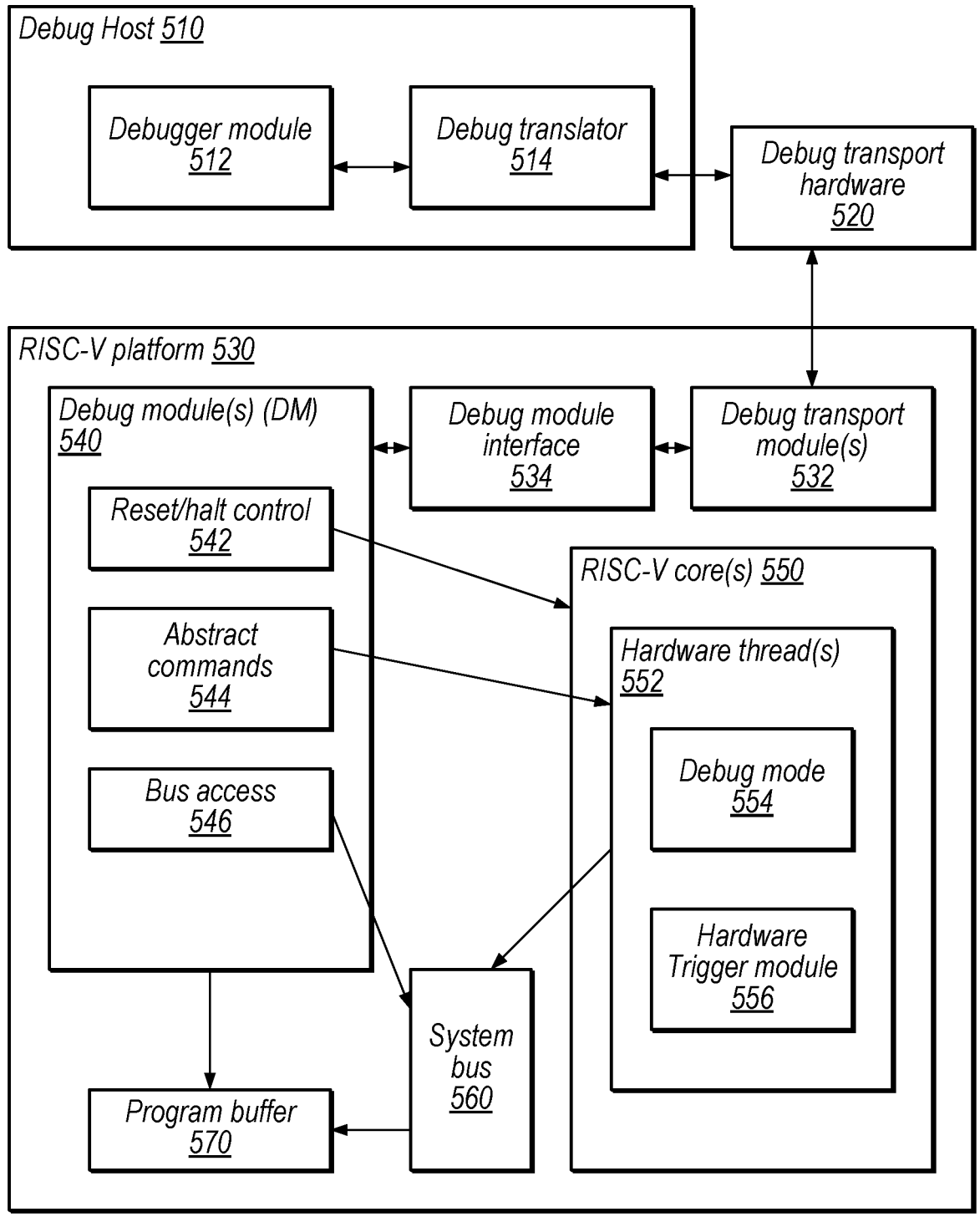
FIG. 5 is a block diagram illustrating an example RISC-V debugging architecture, according to some embodiments.

This disclosure initially describes, with reference to FIGS. 1-3, an overview of a processor and its execution pipeline along with an example system configuration in which the processor may be employed. With reference to FIG. 4, it then describes an overview of control circuitry for hardware cache debugging. FIG. 5 provides an overview of RISC-V debugging. FIG. 6 provides details of example registers while FIGS. 7-11 provide examples of methods for reading and writing different types of cache information.

Processor Overview

FIG. 1 illustrates an embodiment of a processor 100 organized according to a particular microarchitecture. In some embodiments, processor 100 is configured to implement the RISC-V instruction set architecture (ISA), although other embodiments may implement other suitable ISAs. Preliminarily, it is noted that the microarchitecture shown in FIG. 1 represents merely one possible and non-limiting implementation.

In the illustrated embodiment, processor 100 includes an execution core 110 that includes a number of circuits configured to perform various aspects of instruction execution. In particular, core 110 includes a fetch circuit 111 coupled to an aligner circuit 112, which is in turn coupled to a decoder circuit 113. Decoder circuit 113 is coupled to a number of instruction execution circuits, including first and second integer execution circuits respectively denoted IEX0 114 and IEX1 115, along with load/store circuit 116, multiplier circuit 117, and divider circuit 118. Additionally, processor 100 includes a memory processing unit 120, an instruction cache 130, a data cache 140, a bus interface unit 150, a programmable interrupt controller 160, a debug controller circuit 170, and a power management circuit 180.

Generally speaking, core 110 may be configured to fetch instructions and necessary data, execute instructions, and write results either locally (e.g., to a register file) or into a memory subsystem. In particular, fetch circuit 111 may be configured to initiate this process by retrieving instructions for execution. In various embodiments, fetch circuit 111 may be configured to implement program counter logic and branch prediction circuitry in order to track the flow of program execution and attempt to predict the outcome of conditional branches in order to speculatively fetch branch targets. For example, fetch circuit 111 may implement a "gshare"-style branch predictor in which a table of branch direction predictors is used in combination with a branch target buffer (i.e., a cache of branch target addresses) along with the current program counter and an indicator of global branch history to generate a predicted address from which to fetch instructions. Any suitable branch prediction scheme may be employed, however.

The fetch address generated by fetch circuit 111 may be directed to instruction cache 130. In some embodiments, instruction cache 130 may be implemented as a pipelined, banked, set-associative cache that is accessed by performing an index lookup and a tag comparison to verify that the fetch address is in fact present in the cache. In the event of a cache miss, the fetch address may be sent to bus interface unit 150 to be retrieved from external memory coupled to processor 100. In other embodiments, an instruction closely-coupled memory (ICCM) may be provided in addition to or instead of instruction cache 130. Generally speaking, a CCM is a storage array defined by a directly addressable region of memory addresses; it differs from a cache in that there is no possibility of an access "missing" a CCM and thus having a variable latency depending on its hit/miss status. A CCM may thus provide storage that has relatively low access latency that is also predictably consistent, unlike a cache, which may improve the performance of certain computing workloads such as real-time applications. In some embodiments, an instruction read-only memory (IROM) may be provided in addition to or instead of an ICCM; an IROM may provide similar access timing characteristics as an ICCM but has fixed contents (e.g., determined at the time of manufacture) and cannot be written to.

In some ISAs, instructions may have variable lengths. For example, the RISC-V ISA defines a set of 32-bit instructions as well as 16-bit "compressed" variants of a subset of the 32-bit instructions. Accordingly, in some embodiments, aligner circuit 112 may be configured to identify instruction boundaries within the fetch stream and extract the corresponding instructions for further processing. For example, aligner circuit 112 may be configured to identify RISC-V 16-bit compressed instructions and convert them to their uncompressed 32-bit variants for downstream processing, which may simplify later processing relative to preserving the compressed instructions in their native format.

Decoder circuit 113 may be configured to receive fetched instructions from aligner circuit 112 and decode them in order to determine how they should be further processed within core 110. For example, decoder circuit 113 may examine the operand fields of instructions in order to determine instruction dependencies that may dictate when an instruction is ready to execute; if an instruction requires a result that is not yet available, decoder circuit 113 may delay its execution (and possibly the execution of upstream instructions) until its dependencies are satisfied. In some embodiments, decoder circuit 113 may attempt to group multiple instructions for concurrent execution. To simplify the complexity of this task, some embodiments of decoder circuit 113 may limit the number of instructions issued for concurrent execution. For example, although core 110 includes multiple execution units that could in theory operate concurrently, these execution units may be grouped such that only two instructions are issued per cycle by decoder circuit 113. In other embodiments, however, such limitations may not apply.

In some embodiments, decoder circuit 113 may implement additional operations. For example, decoder circuit 113 may detect synchronization attributes of particular instructions (e.g., instructions that may have special execution timing requirements relative to other instructions in order to ensure correct execution) and appropriately stall or freeze the execution pipeline in order to enforce those attributes. In some instances, decoder circuit 113 may also include a register file configured to implement the architected registers defined by the ISA and/or control/status registers defined by the ISA or the particular processor implementation, although these features may alternatively be implemented elsewhere within core 110.

Once processed by decoder circuit 113, instructions may then be issued to the appropriate execution circuit for execution. In the illustrated embodiment, core 110 includes two integer execution circuits IEX0 114 and IEX1 115, each of which may implement circuitry for executing arithmetic, logical, and shift instructions defined by the ISA. In the illustrated embodiment, IEX0 114 and IEX1 115 are each configured to implement two arithmetic/logic units (ALUs), for a total of four ALUs. As will be discussed below with respect to FIG. 2, the ALUs in each execution circuit may be configured to operate in successive pipeline stages rather than concurrently, in order to facilitate bypassing of results from one execution circuit to another.

In addition to the integer execution circuits, load/store circuit 116 may be configured to execute load and store instructions defined by the ISA. For example, load/store circuit 116 may be configured to perform address generation arithmetic and to present the resulting address to data cache 140 for processing. In some embodiments, like instruction cache 130, data cache 140 may be implemented as a pipelined, banked, set-associative cache that is accessed by performing an index lookup and a tag comparison to verify that the address targeted by the load or store instruction is in fact present in the cache. In the event of a data cache miss, the address may be sent to bus interface unit 150 to be retrieved from external memory coupled to processor 100. In some embodiments, a data closely-coupled memory (DCCM) may be provided in addition to or instead of data cache 140. As noted above, a CCM may effectively operate as a directly addressable on-chip memory with predictable access latency, in contrast to a cache that has a variable, probabilistic access latency. In embodiments that implement only a DCCM without a data cache, accesses within the memory range associated with the DCCM may be routed to the DCCM, whereas accesses outside of that range may ultimately be handled by bus interface unit 150.

Multiplier circuit 117 may be configured to implement integer multiplication instructions defined by the ISA. Divider circuit 118 may be configured to implement integer division instructions defined by the ISA. While multiplier circuit 117 may be pipelined, integer division is typically a complex, long-latency operation. Accordingly, in the illustrated embodiment, divider circuit 118 is implemented as a non-pipelined circuit, and instructions dependent on the results of an integer division instruction will stall until the division is complete. It is noted that while floating-point arithmetic is not explicitly discussed above, embodiments of core 110 may include execution circuits that support such operations.

As shown in FIG. 1, processor 100 includes memory processing unit (MPU) 120 interposed between core 110 and other elements of the memory hierarchy, such as instruction cache 130, data cache 140, and bus interface unit 150. In some embodiments, MPU 120 may include circuitry that supports the load/store pipeline, such as buffers and queues. For example, once load/store circuit 116 computes a memory address (or, in some cases, once fetch circuit 111 computes a fetch address), in some embodiments a memory access may be enqueued within MPU 120 while awaiting downstream processing. Similarly, MPU 120 may implement a store buffer that is configured to hold post-commit store instructions (i.e., store instructions that have been completed and are intended to modify programmer-visible state) until they can be written to the memory subsystem via bus interface unit 150. It is noted that in other embodiments, some or all of the features of MPU 120 may be implemented elsewhere within processor 100, such as within load/store circuit 116. Additionally, in some embodiments, MPU 120 may implement protection features that, for example, enforce a privilege model or otherwise restrict access to defined addresses or regions of the memory address space, which may improve the stability and security of code execution. In embodiments of processor 100 that support virtual memory addressing, MPU 120 may additionally include circuitry related to address translation such as translation lookaside buffers (TLBs). As noted above, however, translation circuitry may be located elsewhere within processor 100 depending on design considerations (e.g., whether caches/CCMs are virtually or physically addressed).

Bus interface unit (BIU) 150 may be configured to interface processor 100 with other devices, such as memory, input/output devices, or other peripherals. External devices may either be on-chip (e.g., on the same silicon as processor 100, as in a system-on-a-chip (SoC) implementation) or off-chip. In some embodiments, BIU 150 may interface with external devices according to a version of the Advanced Microcontroller Bus Architecture (AMBA) standard, such as the Advanced High-performance Bus (AHB) bus protocol introduced in the AMBA 2 specification. Any other suitable bus architecture or protocol may be employed, however. BIU 150 may include circuits such as load and store queues configured to store pending load and store instructions as well as state machines or other circuits configured to implement the appropriate bus transaction logic.

In some embodiments of processor 100 that include an ICCM and/or a DCCM, these memory structures may be accessible via direct memory access (DMA) by off-processor devices in addition to being accessed by instructions executing in core 110. In such embodiments, processor 100 may include arbitration circuitry configured to arbitrate competing ICCM/DCCM accesses originating from processor 100 and DMA. For example, processor accesses may generally take priority over DMA accesses, although the arbitration circuitry may employ fairness and/or performance factors to ensure that DMA accesses are eventually serviced. In some embodiments, an ICCM/DCCM may be implemented in a banked manner with arbitration being performed on a per-bank basis, so that different banks may concurrently service accesses from processor 100, DMA, or a combination of these.

Programmable interrupt controller (PIC) 160 may be configured to facilitate the processing of interrupts originating externally to processor 100, such as asynchronous interrupts from peripherals that need to perform input/output. In various embodiments, PIC 160 may implement circuitry configured to prioritize and mask interrupts according to user-programmable specifications, to support vectoring of interrupts to corresponding dedicated interrupt handler locations in memory, to support nesting and chaining of concurrent or successive interrupts, or any other suitable interrupt-related processing. In some embodiments, PIC 160 may process exceptions or faults arising from instruction execution within core 110 in addition to external interrupts.

Debug controller circuit 170 may be configured to implement a variety of debug-related features. For example, RISC-V defines an extensive debugging interface that can enable software to inspect and control the operation of processor 100 at a fine level of granularity. To support these features, debug controller circuit 170 may implement features such as breakpoints, timers, or other event-related triggers that, for example, facilitate pausing of instruction execution when defined events are detected, so that a user can inspect the state of processor 100 and associated memory at that time. Such features, along with features such as single-step execution, may facilitate the debugging of software executing on processor 100.

Some features of debug controller circuit 170 may also be used to perform hardware debug/test, for example as part of a silicon development or manufacturing test scenario. For example, debug controller circuit 170 may implement a command interface that may be accessible either via software or via hardware test features such as JTAG ports. The command interface may enable a user to read and/or write state elements within processor 100, such as register files, memory arrays, and the like. Thus, debug controller circuit 170 may facilitate the injection of test code into processor 100 in order to verify or debug a partially-operative hardware system.

Lastly, power management circuit 180 may be configured to coordinate power management features across processor 100. For example, power management circuit 180 may be configured to implement support for architecturally-defined power management states and to correctly transition processor 100 across those states, e.g., by controlling the sequence in which circuits of processor 100 are energized or depowered. Power management circuit 180 may also be configured to implement other power management features that are not necessarily architecturally defined, such as detecting and depowering idle circuits in order to decrease power consumption.

FIG. 2 is a pipeline diagram illustrating the execution timing of an embodiment of processor 100. As shown, instruction execution proceeds from top to bottom in a nine-stage pipeline, and each row of FIG. 2 represents one execution cycle. In this implementation, the operation of fetch circuit 111 is split across two cycles (denoted Fetch 1 and Fetch 2), during which instruction memory access occurs (e.g., to cache, ICCM, or IROM) and fetch buffers containing unaligned fetch results are populated. A stall may occur at the Fetch 1 stage in the event of a cache miss or line fill condition.

Operation of aligner circuit 112 occurs in the Align stage. A stall may occur here in certain cases of misalignment. For example, if multiple fetch buffers need to be scanned to identify instructions to be decoded, a stall may be necessary. Decoder circuit 113 operates during the Decode stage. In one embodiment, decoder circuit 113 attempts to identify up to two instructions that can be issued together for execution, subject to dependencies, although other embodiments may attempt to identify greater degrees of concurrency. Stalls may occur at the Decode stage based on dependencies, instruction synchronization requirements, or other factors.

Following the Decode stage, processing depends upon which execution circuit an instruction is routed to. Instructions destined for integer execution circuits IEX0 114 or IEX1 115 enter the EX1 stage of Integer Pipe 0 or Integer Pipe 1, respectively. As discussed above, in one embodiment, IEX0 114 and IEX1 115 may each include 2 ALUs, one of which executes at the EX1 stage, and the other of which executes at the EX4 stage. As can be seen relative to the other execution circuit pipelines, including an ALU at the EX4 stage may enable forwarding of results from other execution circuits, and may prevent some instances of dependency-related stalls.

As shown, instruction commit decisions occur during the EX4 or Commit stage. For example, by the end of EX4, all speculative conditions that would prevent an instruction result from properly being committed to architectural state (such as branch mispredictions, exceptions, interrupts, or similar conditions) should be resolved. Either invalid state will be flushed or the instruction currently at EX4 will be permitted to modify architectural state at the EX5 or Writeback stage.

Load/store instructions enter the DC1 stage of the Load/Store Pipe and proceed to perform address generation and cache/DCCM lookup. In the illustrated case, loads and stores are effectively complete at the DC3 stage and can be forwarded, although they still need to proceed to the Commit and Writeback stages before they can be allowed to persistently modify architectural state.

Multiply instructions enter the M1 stage of the Multiply Pipe. As shown, the Multiply Pipe has similar timing to the Load/Store Pipe, with results available for forwarding at the M3 stage. Like load/store instructions, however, multiply instructions still proceed to the Commit and Writeback stages prior to persistently modifying architectural state.

In some embodiments, the Load/Store Pipe and Integer Pipe 0 may be treated as a unit for instruction issue purposes. That is, during a given cycle, decoder circuit 113 may issue an instruction to one of these pipelines, but not the other. Integer Pipe 1 and the Multiply Pipe may be treated as a similar unit, such that decoder circuit 113 may issue up to two instructions per cycle for execution. In other embodiments, more aggressive issue scheduling may be implemented.

As noted above, divide instructions are issued from decoder circuit 113 to divider circuit 118, although in the illustrated embodiment, divide operations are long-latency, unpipelined operations. For completeness, the divider path is shown in FIG. 2 as an issue path alongside the remaining execution pipelines.

Example Computing System

Processor 100 may be included within a variety of system configurations, one example of which is shown in FIG. 3. In various embodiments, system 300 may correspond to a general-purpose computer system, such as a desktop or portable computer, a mobile phone, or the like. System 300 may also correspond to any type of embedded system that may employ one or more instances of processor 100 as a dedicated controller. For example, system 300 may correspond to any type of computer peripheral device such as a mass storage device or storage array, printer, or the like, as well as control systems for automobiles, aviation, manufacturing, and other suitable applications.

As shown, system 300 includes processor 100, memory 310, storage 320, and an input/output (I/O) device interface 330 coupled via an interconnect 340. One or more I/O devices 350 are coupled via I/O interface 330. System 300 also includes a network interface 360 that may be configured to couple system 300 to a network 370 for communications with, e.g., other systems. (In various embodiments, network interface 360 may be coupled to interconnect 340 directly, via I/O interface 330, or according to a different configuration.) It is noted that some or all of the components of system 300 may be fabricated as a system-on-a-chip, although discrete combinations of components may also be employed.

Processor 100 corresponds to one or more instances of the processor configuration described above with respect to FIGS. 1-2, or a suitable variant thereof. Memory 310 may include random access memory (RAM) of any suitable configuration, such as working memory configured to store data and instructions usable by processor 100. Storage 320 may include mass storage devices such as magnetic, optical, or nonvolatile/flash memory storage, or a combination of these. In some embodiments, either of memory 310 or storage 320 may be omitted or integrated into the other as a single memory subsystem from the perspective of processor 100.

I/O interface 330 may be configured to interface between interconnect 340 and one or more other types of buses or interfaces. For example, interconnect 340 may correspond to the AHB interface discussed above (or another suitable type of high-bandwidth interconnect), and I/O interface 330 may be configured as a bridge device that enables coupling of different types of I/O devices to interconnect 340. I/O interface 330 may implement one or more interface protocols such as Universal Serial Bus, Firewire, or other suitable standards. I/O device(s) 350 may include any suitable type of storage, network interface, user interface, graphics processing, or other type of device. Network 370, if present, may be any suitable type of wired or wireless communications network, such as an Internet Protocol (IP) addressed local or wide-area network, a telecommunications network, or the like. Network interface 360, if present, may be configured to implement any suitable network interface protocol needed for communication with network 370.

Example Debug Cache Access Techniques

In various embodiments, a processor includes debug circuitry and one or more processor cores. As one example, the debug circuitry may be a debug module (DM) and the processor cores may be RISC-V cores. In some embodiments, the debug circuitry receives debug information (e.g., via a JTAG interface) and communicates with the processor using intermediate debug commands (e.g., abstract commands as discussed in the RISC-V debug specification) to access processor data. The intermediate commands may identify the debug operations to be performed without specifying how the specific processor core implementation is to perform those operations. The discussion below relates to techniques for advantageously implementing cache access commands in hardware using control registers.

Example embodiments discussed below relate to accessing an instruction cache, but similar techniques may be applied to access various types of on-chip data structures that are accessible via a well-defined interface. Further note that, although various examples are discussed herein with reference to RISC-V, this discussion is not intended to limit the scope of the present disclosure. Rather, the disclosed techniques may be used for processors of various instruction set architectures that include features similar to those discussed herein.

FIG. 4 is a block diagram illustrating an example processor that includes debug circuitry 410 and a processor core 420. In the illustrated embodiment, debug circuitry includes an external interface. This interface may be used by a debug host to control debugging of the processor. In some embodiments, this interface is a joint test action group (JTAG)-specified interface, such as an interface that implements the IEEE 1149.1-2013 standard.

Debug circuitry 410, in the illustrated embodiment, receives debug control signals from the external interface and generates abstract commands based on these signals. These commands may specify an action to perform and parameters for the action, but may be not specify specific operations to perform the action. One example of an abstract command is an "access register" command that includes fields to specify access size, a number of registers to access, whether post-increment occurs on the number of registers, whether a program buffer should be executed after the transfer, whether to read or write, and whether to perform the access (e.g., this field may indicate not to perform the access in order to simply execute instructions in a program buffer). Other examples of abstract commands include a "quick access" command and an "access memory" command, e.g., as specified in the draft version of the RISC-V external debug support specification version 0.13.1.

Processor core 420, in the illustrated embodiment, includes control circuitry 422, control registers 426, and cache 424. In some embodiments, control circuitry 422 is configured to use control registers 426 to read from and write to cache 424. The data may include cached data, tag information, status information, parity or ECC information, etc.

In some embodiments, the following procedure is used to access an instruction cache via the debug circuitry 410. First, the debug circuitry 410 requests a core halt. The core may be considered halted when it has stopped fetching and executing instructions, the instruction and data caches have stopped transaction, and outstanding bus transactions are completed. Note that DMA transactions may still occur in this state, in some embodiments. Once the core has reached a halted state, it may send an acknowledgment to debug circuitry 410. In some embodiments, a core halt may not be performed and the disclosed techniques may be performed while the core is running. In these embodiments, synchronization may be performed between the processor core 420 and the debug circuitry 410 along with the disclosed techniques. Speaking generally, a core halt is one example of a synchronization step.

Second, debug circuitry 410 issues writes of one or more CSRs. Specific examples of CSRs are discussed below with reference to FIG. 6. For example, control registers 426 may include DICIWICS, DICAD0, DICAD1, and DICAGO registers. In other embodiments, any of various structures may be used to implement cache control.

Third, debug circuitry 410 issues reads of one or more CSRs (if cache data is being accessed). In some embodiments, reads are self-synchronizing, e.g., because the time needed to complete the cache access is much less than the time needed to perform a CSR read. In other embodiments, synchronization may be performed to ensure that the CSR contents are ready before reading.

Fourth, debug circuitry 410 requests that the core 420 resume execution. Core 420 may then flush and start fetching instructions (e.g., based on a program counter).

Note that, in some embodiments the disclosed techniques may be used to write "bad" parity or ECC data to either data or tags to deliberately create an error. This may be used to test whether the core 420 properly produces errors. Parity and ECC are discussed herein for purposes of illustration as example of error protection information, but similar techniques may be used for other various types of error protection information, etc.

Overview of RISC-V Debug Architecture

As discussed above, in some embodiments the disclosed techniques may be performed in the context of the RISC-V architecture. FIG. 5 is a block diagram based on FIG. 2.1 of version 0.13.1 of the RISC-V External Debug Support specification. In some embodiments, a user interacts with the debug host 510 (e.g., a laptop computer) that runs a debug module 512 such as gdb. The debug translator 514 (e.g., openOCD) communicates with debug transport hardware 520 (e.g., a USB-JTAG adapter) which connects to one or more debug modules 540 on the RISC-V platform 530 (e.g., via debug transport module(s) 532 and debug module interface 534). Debug module(s) 540 represent an embodiment of debug circuitry 410.

In the illustrated embodiment, debug module(s) 540 communicate with RISC-V core(s) 550 using reset/halt control module 542, abstract commands module 544, and bus access module 546. As shown, debug module(s) 540 may send reset/halt control signaling and abstract commands to the cores and may also access system bus 560 and program buffer 570.

The program buffer 570 may allow the debugger to execute arbitrary instructions and/or access memory. In some embodiments, the disclosed techniques do not use a program buffer, but the RISC-V core(s) 550 implements control units configured to convert abstract commands to other signaling (e.g., CSR accesses). Such hardware debugging that does not use the program buffer may be advantageous relative to software debugging in certain instances, to avoid executing instructions during debug. In some embodiments, bus access module 546 allows the debug module to access memory (that is external to the processor core) without using a processor core.

The RISC-V core(s) 550, in the illustrated embodiment, each implement one or more hardware thread(s) 552 which include a hardware trigger module 556. The trigger module may allow a core to halt and inform a debug module 540 when trigger conditions are met.

In some embodiments, the disclosed techniques use RISC-V abstract commands from the debug circuitry 410 to control circuitry 422, e.g., by extending their functionality. In other embodiments, the disclosed techniques use custom-defined abstract commands that are not defined in the RISC-V debug specification. In still other embodiments, the debug circuitry 410 may send register access commands directly to control circuitry 422 instead of sending abstract commands.

Example CSR Implementation

FIG. 6 is a diagram illustrating example fields for four control/status registers for instruction cache access, according to some embodiments. In some embodiments, control circuitry 422 writes the DICAWICS register with cache address information specifying the location(s) to be read/written. The DICAWICS register, in the illustrated embodiment, includes an array bit used to select either the data array or the tag array and status. In the illustrated embodiment, this includes parity bits and valid and LRU bits. In the illustrated embodiment, this register also includes a way select field and an index select field. Note that the details of FIG. 6 such as address format and numbers of bits are included for purposes of illustration but are not intended to limit the scope of the present disclosure. Various fields and field sizes may be implemented in other embodiments. In some embodiments, one or more bits in the DICAWICS register (not explicitly shown) may be used to select between memories (e.g., to select memories other than the instruction cache) to use the same diagnostic CSRs for multiple on-chip memories.

In the illustrated embodiment, the DICAD0 register includes fields for instruction data, tag, LRU bits, and a valid bit. These fields may be used to store data accessed from the cache or to store data to be written to the cache.

In the illustrated embodiment, the DICAD1 register includes parity fields for instruction and tag data. In ECC embodiments, DICAD1 may also include the following additional fields: ecc1 in bits 9:5 as ECC for I-cache data bytes 3/2 (instr[31:16]) and ecc0 in bits 4:0 as ECC for I-cache data bytes 1/0 (instr[15:0]), or ECC for I-cache tag.

In the illustrated embodiment, the DICAGO register is a trigger register, where reading the register triggers a cache read and writing the register triggers a cache write, based on the contents of DICAWICS, DICAD0, and DICAD1.

Note that the specific registers discussed above are not intended to limit the scope of the present disclosure. As another example, a RISC-V diagnostic access abstract command may be used in combination with the RISC-V-defined command register and three data registers (data0, data1, and data2). In some embodiments, the trigger function described above for DICAGO may instead be mapped to the command register and ones of the data registers used for functionality similar to the DICAD0, DICAD1, and DICAWICS registers described above. In these embodiments, data0 and data1, for example, might be used to return values for certain access types.

Example Read/Write Methods

FIG. 7 is a flow diagram illustrating an example method for reading a chunk of data from a cache line, according to some embodiments. At 710, in the illustrated embodiment, control circuitry 422 writes array, way, and address information to the DICAWICS register that indicates which location to access in the cache. At 720, in the illustrated embodiment, the control circuitry 422 reads the DICAGO register which causes a read access from the cache data array at the location selected by the DICAWICS register. At 730, in the illustrated embodiment, the control circuitry 422 reads the DICAD0 register to get the selected cache line chunk (e.g., a 32-bit chunk) and reads the DICAD1 register to get the associated parity or ECC bit(s).

FIG. 8 is a flow diagram illustrating an example method for writing a chunk of data to a cache line, according to some embodiments. At 810, in the illustrated embodiment, control circuitry 422 writes array, way, and address information to the DICAWICS register that indicates which location to access in the cache. At 820, in the illustrated embodiment, the control circuitry 422 writes the new instruction information to the instruction field of the DICAD0 register and writes calculated parity or ECC bits to fields of the DICAD1 register. At 830, in the illustrated embodiment, the control circuitry 422 writes to a go field of the DICAGO register which causes a write access using the data in the DICAD0 and DICAD1 registers to the location selected by the DICAWICS register.

FIG. 9 is a flow diagram illustrating an example method for reading tag and status information, according to some embodiments. At 910, in the illustrated embodiment, control circuitry 422 writes array, way, and address information to the DICAWICS register that indicates which location to access in the cache. At 920, in the illustrated embodiment, the control circuitry 422 reads the DICAGO register which causes a read access from the cache tag array and status bits at the location selected by the DICAWICS register. At 930, in the illustrated embodiment, the control circuitry 422 reads the DICAD0 register to get the selected cache line's tag, valid bit, and LRU field and reads the DICAD1 register to get the tags parity or ECC information.

FIG. 10 is a flow diagram illustrating an example method for writing tag and status information, according to some embodiments. At 1010, in the illustrated embodiment, control circuitry 422 writes array, way, and address information to the DICAWICS register that indicates which location to access in the cache. At 1020, in the illustrated embodiment, the control circuitry 422 writes the new tag, valid, and LRU information to the DICAD0 register and writes calculated parity or ECC information to the DICAD1 register. At 1030, in the illustrated embodiment, the control circuitry 422 writes to a go field of the DICAGO register which causes a write access using the data in the DICAD0 and DICAD1 registers to the location selected by the DICAWICS register.

Figure 11:
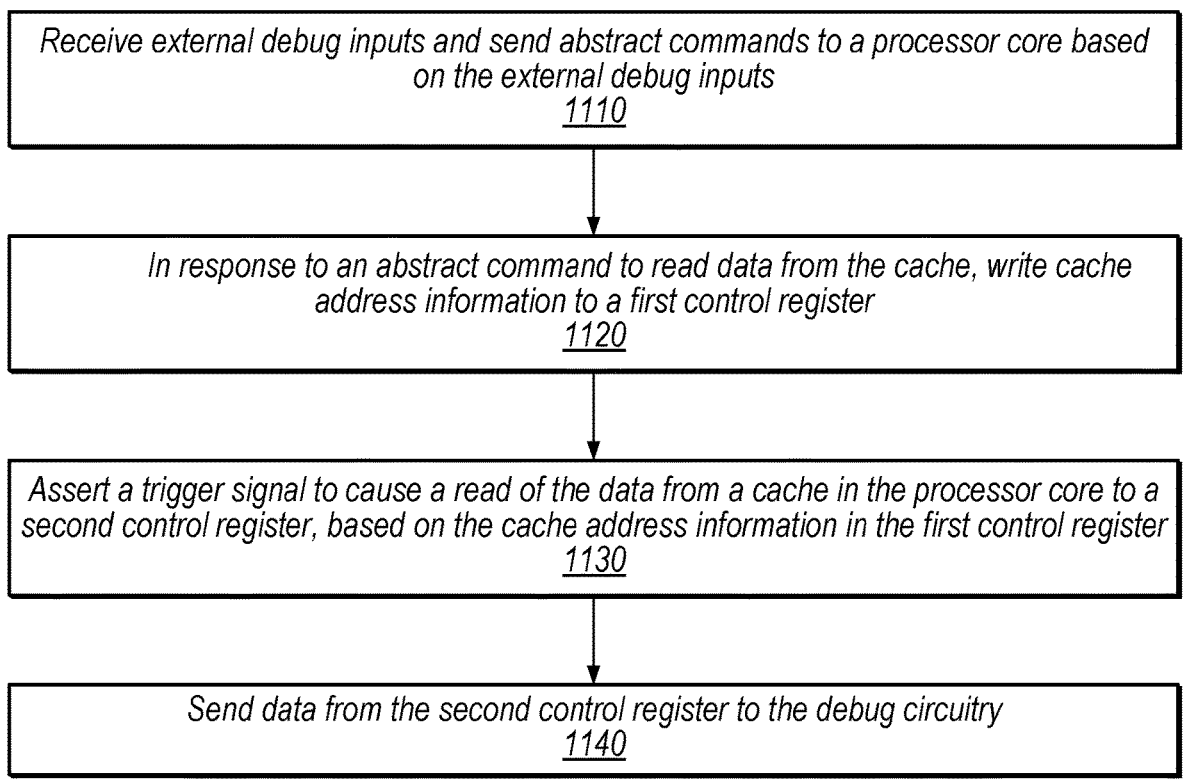
FIG. 11 is a flow diagram illustrating a more general example method for hardware debugging a cache using abstract commands and control registers, according to some embodiments.

FIG. 11 is a flow illustrating a method for real-time scheduling and execution of tasks, according to some embodiments. The method shown in FIG. 11 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1110, in the illustrated embodiment, debug circuitry receives external debug inputs and sends abstract commands to a processor core based on the external debug inputs.

At 1120, in the illustrated embodiment, in response to an abstract command to read data from the cache, control circuitry writes cache address information to a first control register. Note that elements 1120, 1130, and 1140 may be performed in response to the abstract command to read data from the cache.

At 1130, in the illustrated embodiment, the control circuitry asserts a trigger signal to cause a read of the data from a cache in the processor core to a second control register, based on the cache address information in the first control register.

At 1140, in the illustrated embodiment, the control circuitry sends data from the second control register to the debug circuitry.

In some embodiments, the trigger signal is a register read. In some embodiments, the data includes tag and status data for a cache line. In some embodiments, the data includes cached instruction data and error protection information for the cached instruction data. In some embodiments, the cache address information specifies an array, a way, and an index.

In some embodiments, the control circuitry also writes data to a control register and asserts a trigger signal to cause a write of the data from the control register to the cache, based on the cache address information. The write may be performed based on the same abstract command or a different abstract command as the read of data from the cache at element 1130. In some embodiments, control circuitry further writes error protection information to the cache for the written data. In some embodiments, the control registers are accessible only in a debug mode of the processor core.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a processor core that includes a cache;
debug circuitry configured to receive external debug inputs and send abstract commands to the processor core based on the external debug inputs; and
control circuitry in the processor core configured to, in response to an abstract command to read data from the cache:
write cache address information to a first control register;
assert a trigger signal to cause a read of the data from the cache to a second control register, based on the cache address information in the first control register, wherein the data includes tag data for one or more cache lines of the cache and status data for one or more cache lines of the cache; and
send the data from the second control register to the debug circuitry.

2. The apparatus of claim 1, wherein the trigger signal is a register read.

3. The apparatus of claim 1, wherein the data includes cached instruction data and error protection information for the cached instruction data.

4. The apparatus of claim 1, wherein the cache address information specifies an array, a way, and an index.

5. The apparatus of claim 1, wherein the control circuitry is further configured to, in response to an abstract command from the debug circuitry to write data to the cache:
write data to a control register; and
assert a trigger signal to cause a write of the data from the control register to the cache, based on the cache address information.

6. The apparatus of claim 5, wherein the control circuitry is further configured to write error protection information to the cache for the written data.

7. The apparatus of claim 1, wherein the control registers are accessible only in a debug mode of the processor core.

8. A method, comprising:
receiving, by debug circuitry, external debug inputs and sending abstract commands to a processor core based on the external debug inputs; and
in response to an abstract command to read data from a cache in the processor core:
writing, by control circuitry, cache address information to a first control register;
asserting, by the control circuitry, a trigger signal to cause a read of the data from the cache to a second control register, based on the cache address information in the first control register, wherein the data includes tag data for one or more cache lines of the cache and status data for one or more cache lines of the cache; and
sending the data from the second control register to the debug circuitry.

9. The method of claim 8, wherein the trigger signal is a register read.

10. The method of claim 8, wherein the data includes cached instruction data and error protection information for the cached instruction data.

11. The method of claim 8, further comprising, in response to an abstract command from the debug circuitry to write data to the cache:
writing, by the control circuitry, data to a control register; and
asserting, by the control circuitry, a trigger signal to cause a write of the data from the control register to the cache, based on the cache address information.

12. A non-transitory computer readable storage medium having stored thereon design information that specifies a design of at least a portion of a hardware integrated circuit in a format recognized by a semiconductor fabrication system that is configured to use the design information to produce the circuit according to the design, including:
a processor core that includes a cache;
debug circuitry configured to receive external debug inputs and send abstract commands to the processor core based on the external debug inputs; and
control circuitry in the processor core configured to, in response to an abstract command to read data from the cache:
write cache address information to a first control register;
assert a trigger signal to cause a read of the data from the cache to a second control register, based on the cache address information in the first control register, wherein the data includes tag data for one or more cache lines of the cache and status data for one or more cache lines of the cache; and send the data from the second control register to the debug circuitry.

13. The non-transitory computer readable storage medium of claim 12, wherein the trigger signal is a register read.

14. The non-transitory computer readable storage medium of claim 12, wherein the data includes cached instruction data and error protection information for the cached instruction data.

15. The non-transitory computer readable storage medium of claim 12, wherein the cache address information specifies an array, a way, and an index.

16. The non-transitory computer readable storage medium of claim 12, wherein the control circuitry is further configured to, in response to an abstract command from the debug circuitry to write data to the cache:

write data to a control register; and assert a trigger signal to cause a write of the data from the control register to the cache, based on the cache address information.

17. The non-transitory computer readable storage medium of claim 16, wherein the control circuitry is further configured to write error protection information to the cache for the written data.

* * * * *